(12) United States Patent
Nordby et al.

(10) Patent No.: US 12,045,404 B1
(45) Date of Patent: Jul. 23, 2024

(54) ACTIVE PEN-STYLUS PRECISE ERASER

(71) Applicant: reMarkable A/S, Oslo (NO)

(72) Inventors: Gaute Wiig Nordby, Oslo (NO); Torje Asdahl, Oslo (NO); Anna Karoline Øren Lillerud, Oslo (NO); Espen Lie, Oslo (NO)

(73) Assignee: reMarkable AS, Oslo (NO)

( * ) Notice: Subject to any disclaimer, the term of this patent is extended or adjusted under 35 U.S.C. 154(b) by 0 days.

(21) Appl. No.: 18/208,280

(22) Filed: Jun. 11, 2023

Related U.S. Application Data

(60) Provisional application No. 63/351,355, filed on Jun. 11, 2022.

(51) Int. Cl.
*G06F 3/0354* (2013.01)
*G06F 3/038* (2013.01)

(52) U.S. Cl.
CPC .......... *G06F 3/038* (2013.01); *G06F 3/03545* (2013.01)

(58) Field of Classification Search
CPC ... G01D 5/2066; G01L 1/144; G06F 3/03545; G06F 3/0383; G06F 3/046; G06F 3/038
See application file for complete search history.

(56) References Cited

U.S. PATENT DOCUMENTS

| | | | | |
|---|---|---|---|---|
| 9,213,424 B1* | 12/2015 | Dunn | .................... | G06F 3/0441 |
| 2018/0052534 A1* | 2/2018 | Ron | ........................ | G06T 11/60 |
| 2019/0369755 A1* | 12/2019 | Roper | .................... | G06F 3/0481 |
| 2021/0311603 A1* | 10/2021 | Baki | ....................... | G06F 3/046 |

* cited by examiner

*Primary Examiner* — Md Saiful A Siddiqui
(74) *Attorney, Agent, or Firm* — AWA Sweden AB; Thomas L. Ewing

(57) ABSTRACT

Embodiments of the invention provide an improved structure and method for determining the tilt angle associated with the erasure component of an active pen-stylus relative to the display on a matching computing device by analysis of two different antenna signals associated with the erasure function and then employing this calculated tilt angle to determine an area of erasure on the display device associated with the active pen-stylus. Embodiments of the invention may effectively copy in an electronic eraser, the ability of a conventional rubber eraser to control an area of erasure based on the tilt of the eraser, e.g., a heavy area of erasure when the eraser is held at an angle or a shallow area of erasure when the eraser is held in a more upright position.

11 Claims, 8 Drawing Sheets

ACTIVE PEN-STYLUS PRECISE ERASER

TECHNICAL FIELD

The disclosure relates generally to a pointing device, adapted for various coordinate input devices such as a digitizer or a tablet, which provide inputs to various types of computing systems. In particular, embodiments of the present invention relate to a pen-stylus constructed to provide an eraser function.

BACKGROUND

Mobile telephones, tablet computers, PCs, car entertainment systems, white goods and many other devices are commonly equipped with interactive displays. These interactive displays combine a display screen, such as an LCD, oLED, plasma or electrophoretic display (EPD), with an input system, such as a touch- or pen-stylus-input system. The input system recognizes the presence of an input object such as a pen-stylus touching or in close proximity to the display screen. The device typically responds to such inputs by performing one or more functions, which may include changing what is shown on the display screen.

A "pen-stylus" (or "pen" or "stylus") is a pen- or pencil-shaped instrument whose tip position on a computer monitor can be detected either electronically or physically. The pen-stylus enables users to perform tasks, such as drawing or making selections on a computing device. While devices with touchscreens such as some computers, mobile devices (smartphones and personal digital assistants), game consoles, and graphics tablets can often be operated with a fingertip, a pen-stylus typically provides more accurate and controllable input. In essence, a pen-stylus has a similar function as a mouse or touchpad as a pointing device but may enable much more precise inputs for certain drawing tasks. The use of a pen-stylus is sometimes termed "pen-stylus computing."

Conventional pen-styluses have been constructed to detect "pen-down" information in addition to coordinate information on the pointing device. Such pen-down information typically arises when the pen-stylus point is in contact with a panel of the digitizer. The pen-down information is conventionally detected by either pressure sensitive means for detecting the vertical pressure applied to the pen-stylus point and/or detected by an electrical connection between the pen-stylus and the panel of the digitizer. The position data may be smoothed and/or de-noised before it is used to estimate the velocity and/or the acceleration of the input object. Such smoothing and/or de-noising may be done using an appropriate technique—for example, by applying a recursive Bayesian filter or smoothing, such as a Kalman filter, to the position data.

Active pen-styluses (also known as "active pen" or "digital styluses") include digital components and/or circuitry inside the pen-stylus that communicates with a digitizer on the touch device. This communication allows for advanced features such as pressure sensitivity; tilt detection; programmable buttons; palm detection; eraser tips; memorizing settings and writing data transmission.

Active pen-styluses typically employ different protocols from different manufacturers in order to communicate with the digitizer of a graphic tablet or multi-touch device. For an active pen-stylus to function properly, its digital component protocol must match the digitizer technology in the touch screen it is interacting with. Thus, the digital protocol of the pen-stylus must be compatible with the device digitizer, otherwise input from the pen-stylus will not register on the device. Active pen-styluses are typically powered by a removable or chargeable battery or operate passively by inductance.

A pen-stylus' performance is often measured by four characteristics: 1) Comfort, 2) Resistance, 3) Balance and Overall Weight, and 4) Precision. "Precision" can sometimes be a nebulous characteristic, so it is often described in terms of further characteristics, such as: 1) Responsiveness and Speed, 2) Jitter, 3) Tilt, 4) Levels of pressure, and 5) Palm rejection or detection. This last element of precision may prevent a touch device from registering or marking the screen when a hand or palm is resting on the screen surface. Effective operation may rely on a combination of technology in the pen-stylus, the operating system software and the screen digitizer technology for effective operation.

While pen-stylus technology has made great strides in recent years in improving pen-stylus technology, further improvements are still warranted. Moreover, specific use cases for pen-styluses may compel levels of precision and additional functionality not available in conventional devices.

SUMMARY OF THE INVENTION

Embodiments of the invention relate to a system for determining an area of erasure in an active pen-stylus. The system comprises an erasure system in the active pen-stylus that receives user erasure data input related to erasing portions of a display on the screen of the display device. The system also includes a pen antenna circuit in the active pen-stylus that receives the user drawing data from the active pen-stylus system and receives the user erasure data from the erasure system. The system further includes an eraser antenna system comprising at least two antennas, the eraser antenna system proximally located in a rear portion of the active pen-stylus that receives user erasure data from the pen antenna circuit and uses the at least two antennas to transmit the user erasure data to the display device, wherein a first antenna of the at least two antennas in the eraser antenna system has a different location in the rear of the active pen-stylus than a second of the at least two antennas in the eraser antenna system, wherein the user erasure data includes orientation data related to the first antenna and the second antenna of the at least two antennas in the eraser antenna system. The graphics display component in the display devices uses the received user erasure data to compute a tilt angle between the first of the at least two antennas in the eraser antenna system and the second of the at least two antennas in the eraser antenna system to determine the area of erasure associated with the display on the screen of the computing device.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The figures depict various embodiments of the presented invention for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Disclosed is a configuration (including a system, a process, as well as a non-transitory computer readable storage medium storing program code) for calculating the tilt angle of the eraser on an active-pen stylus and then employing this tilt angle calculation to determine an area of erasure on a display associated with a computing device (e.g., a tablet computing device).

Example System and Device Configuration

Figure 1:
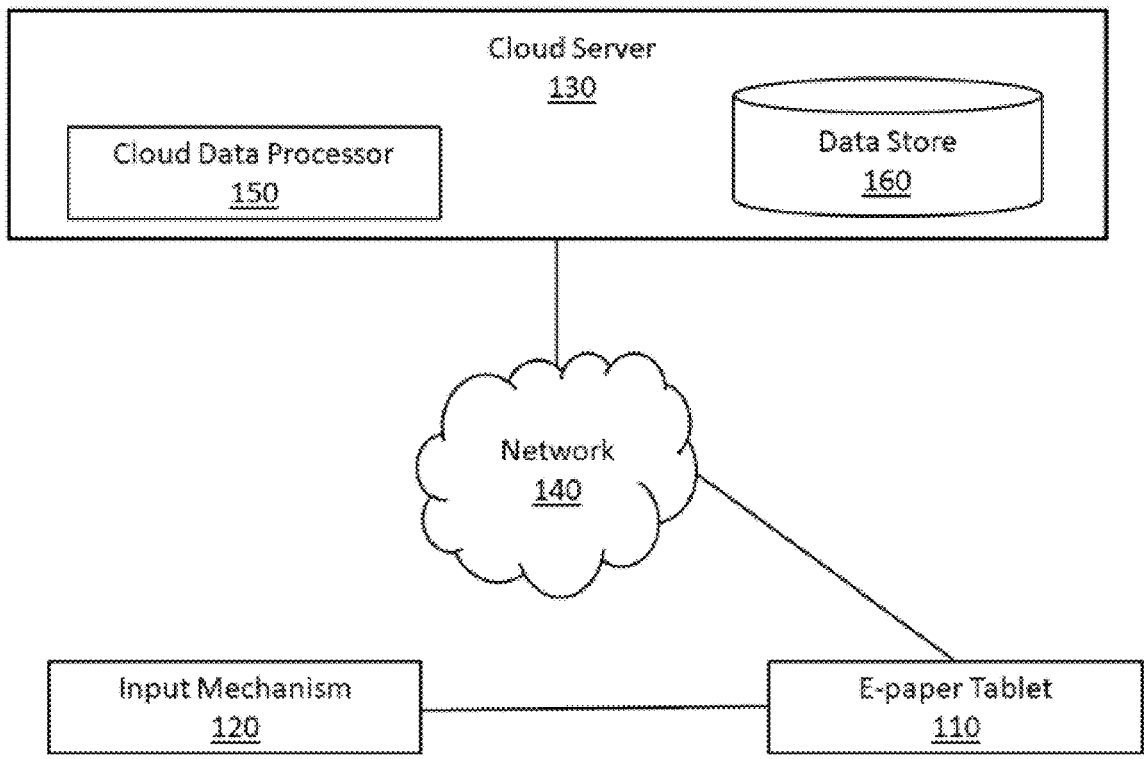
FIG. 1 illustrates a system architecture for an e-paper tablet device that receives inputs from the input mechanism such as a pen-stylus, according to one example embodiment.

As shown in FIG. 1, the e-paper tablet device 110 receives inputs from the input mechanism 120, for example, when the input mechanism 120 makes physical contact with a contact-sensitive surface (e.g., the touch-sensitive screen) on the e-paper tablet device 110 as the user makes a gesture of some sort with the input mechanism 120. The input mechanism 120 may be a pen-stylus, such as the pen-stylus described in FIG. 4. The e-paper tablet device 120 here is referred to as an "e-paper tablet," a device that mimics the appearance of ordinary ink on paper. Such devices are also known as "electronic paper" and "electronic ink". While embodiments of the invention have been designed for e-paper systems, embodiments of the invention may also be suitable for other forms of computing devices capable of receiving and processing inputs from pen-stylus devices. Based on the nature of the contact, the e-paper tablet device 110 generates and executes instructions for updating content displayed on the contact-sensitive screen to reflect the gesture inputs. For example, in response to a gesture transcribing a verbal message (e.g., a written text or a drawing), the e-paper tablet device 110 updates the contact-sensitive screen to display the transcribed message. As another example, in response to a gesture selecting a navigation option, the e-paper tablet device 110 updates the screen to display a new page associated with the navigation option.

The input mechanism 120 may refer to any device or object that is compatible with the contact-sensitive screen of the e-paper tablet device 110, particularly the pen-stylus device described herein. In one embodiment, the input mechanism 120 may work with an electronic ink (e.g., E-ink) contact-sensitive screen. For example, the input mechanism 120 may refer to any device or object that can interface with a screen and, from which, the screen can detect a touch or contact of said input mechanism 120. Once the touch or contact is detected, electronics associated with the screen generate a signal which the e-paper tablet device 110 can process as a gesture that may be provided for display on the screen. Upon detecting a gesture by the input mechanism 120, electronics within the contact-sensitive screen generate a signal that encodes instructions for displaying content or updating content previously displayed on the screen of the e-paper tablet device 110 based on the movement of the detected gesture across the screen. For example, when processed by the e-paper tablet device 110, the encoded signal may cause a representation of the detected gesture to be displayed on the screen of the e-paper tablet device 110, for example a scribble. As mentioned, the input mechanism 120 may a pen-stylus or another type of pointing device, including a part of a user's body, such as a finger.

In one embodiment, the input mechanism 120 is an encased magnetic coil. When in proximity to the screen of the e-paper tablet device 110, the magnetic coil helps generate a magnetic field that encodes a signal that communicates instructions, which are processed by the e-paper tablet device 110 to provide a representation of the gesture for display on the screen, e.g., as a marking. The input mechanism 120 may be pressure-sensitive such that contact with the contact-sensitive display causes the magnetic coil to compress. In turn, the interaction between the compressed coil and the contact-sensitive screen of the e-paper tablet device 110, may generate a different encoded signal for processing, for example, to provide for display a representation of the gesture on the screen that has different characteristics, e.g., thicker line marking. In alternate embodiments, the input mechanism 120 includes a power source, e.g., a battery, which can generate an electric field with a contact-sensitive surface. It is noted that the encoded signal is a signal that is generated and may be communicated. The encoded signal may have a signal pattern that may be used for further analog or digital analysis (or interpretation).

In one embodiment, the contact-sensitive screen is a capacitive touchscreen. The screen may be designed using a glass material coated with a conductive material. Electrodes, or an alternate current carrying electric component, are arranged vertically along the glass coating of the screen to maintain a constant level of current running throughout the screen. A second set of electrodes are arranged horizontally. The matrix of vertical active electrodes and horizontal inactive electrodes generates an electrostatic field at each point on the screen. When an input mechanism 120 with conductive properties, for example the encased magnetic coil or a human finger, is brought into contact with an area of the screen of the e-paper tablet device 110, current flows through the horizontally arranged electrodes, disrupting the electrostatic field at the contacted point on the screen. The disruption in the electrostatic field at each point that a gesture covers may be measured, for example as a change in capacitance, and encoded into an analog or digital signal.

In an alternate embodiment, the contact-sensitive screen is a resistive touchscreen. The resistive touch screen comprises two metallic layers: a first metallic layer in which striped electrodes are positioned on a substrate, for example a glass or plastic and a second metallic layer in which transparent electrodes are positioned. When contact from an input mechanism, for example a pen-stylus, finger, or palm, is made on the surface of the touchscreen, the two layers are pressed together. Upon contact, a voltage gradient is applied to the first layer and measured as a distance by the second layer to determine a horizontal coordinate of the contact on the screen. The voltage gradient is subsequently applied to the second layer to determine a vertical coordinate of the contact on the screen. The combination of the horizontal coordinate and the vertical coordinate register an exact location of the contact on the contact-sensitive screen. Unlike capacitive touchscreens which rely on conductive input mechanisms, a resistive touchscreen is configured to sense contact from nearly any input mechanism. Although some embodiments of the e-paper tablet device are described herein with reference to a capacitive touchscreen, one skilled in the art would recognize that a resistive touchscreen could also be implemented.

In an alternate embodiment, the contact-sensitive screen is an inductive touchscreen. An inductive touchscreen comprises a metal front layer that is configured to detect deflections when contact is made on the screen by an input mechanism. Accordingly, an inductive touchscreen is configured to sense contact from nearly any input mechanism. Although some embodiments of the e-paper tablet device are described herein with reference to a capacitive touchscreen, one skilled in the art would recognize that alternative touchscreen technology may be implemented, for example, an inductive touchscreen could also be implemented.

The cloud server 130 is configured to receive information from the e-paper tablet device and/or communicate instructions to the e-paper tablet device 110. As illustrated in FIG. 1, the cloud server 130 may comprise a cloud data processor 150 and a data store 160. Data recorded and stored by the e-paper tablet device 110 may be communicated via the network 140 to the cloud server 130 for storage in the data store 160. For example, the data store 160 may store documents, images, or other types of content generated or recorded by a user through the e-paper tablet device 110. In some embodiments, the cloud data processor 150 monitors the activity and usage of the e-paper tablet device 110 and communicates processing instructions to the e-paper tablet device 110. For example, the cloud data processor 150 may regulate synchronization protocols for data stored in the data store 160 with the e-paper tablet device 110.

Interactions between the e-paper tablet device 110 and the cloud server 130 are typically performed via the network 140, which enables communication between the e-paper tablet device 110 and the cloud server 130. In one embodiment, the network 140 uses standard communication technologies and/or protocols including, but not limited to, links using technologies such as Ethernet, 802.11, worldwide interoperability for microwave access (WiMAX), 3G, 4G, LTE, digital subscriber line (DSL), asynchronous transfer mode (ATM), InfiniBand, and PCI Express Advanced Switching. The network 140 may also utilize dedicated, custom, or private communication links. The network 140 may comprise any combination of local area and/or wide area networks, using both wired and wireless communication systems.

Figure 2:
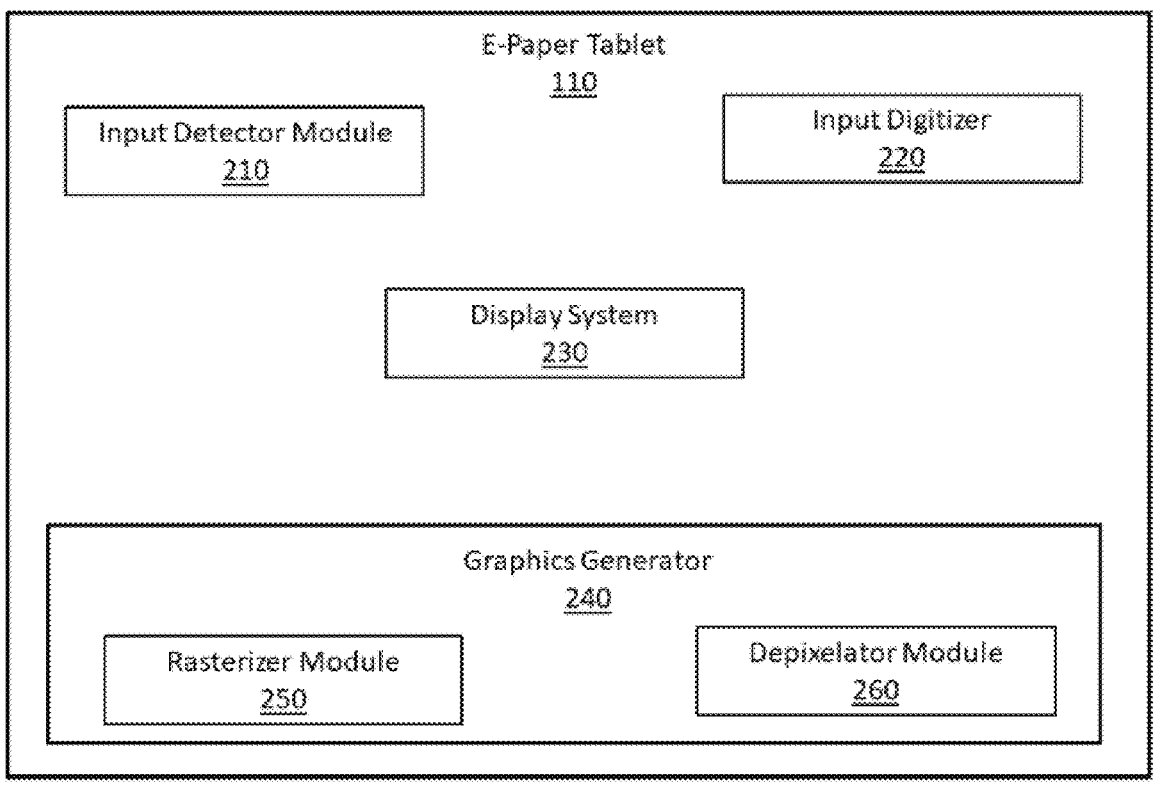
FIG. 2 is a block diagram of the system architecture of an e-paper tablet device, according to one example embodiment.

FIG. 2 is a block diagram of the system architecture of an e-paper tablet device, according to one example embodiment. In the embodiment illustrated in FIG. 2, the e-paper tablet device 110 comprises an input detector module 210, an input digitizer 220, a display system 230, and a graphics generator 240.

The input detector module 210 may be configured to recognize that a gesture has been or is being made on the screen of the e-paper tablet device 110. The input detector module 210 refers to electronics integrated into the screen of the e-paper tablet device 110 that are configured to interpret an encoded signal generated by contact between the input mechanism 120 and the screen into a recognizable gesture. To do so, the input detector module 210 may evaluate properties of the encoded signal to determine whether the signal represents a gesture made intentionally by a user or a gesture made unintentionally by a user.

The input digitizer 220 may be configured to convert the analog signal encoded by the contact between the input mechanism 120 and the screen into a digital set of instructions. The converted digital set of instructions may be processed by the e-paper tablet device 110 to generate or update a user interface displayed on the screen to reflect an intentional gesture.

The display system 230 may include the physical and firmware (or software) components to provide for display (e.g., render) on a screen a user interface. The user interface may correspond to any type of visual representation that may be presented to or viewed by a user of the e-paper tablet device 110.

Based on the digital signal generated by the input digitizer 220, the graphics generator 240 may be configured to generate or update graphics of a user interface to be displayed on the screen of the e-paper tablet device. The display system 230 may be configured to present those graphics of the user interface for display to a user using electronics integrated into the screen.

When an input mechanism 120 makes contact with a contact-sensitive screen of a e-paper tablet device 110, the input detector module 210 recognizes a gesture has been made through the screen. The gesture may be recognized as a part of an encoded signal generated by the compression of the coil in the input mechanism 120 and/or corresponding electronics of the screen of the display system 230. The encoded signal is transmitted to the input detector module 210, which evaluates properties of the encoded signal in view of at least one gesture rule to determine whether the gesture was made intentionally by a user. If the input detector module 210 determines that the gesture was made intentionally, the input detector module 210 communicates the encoded signal to the digitizer output. The encoded signal is an analog representation of the gesture received by a matrix of sensors embedded in the screen of the device 110.

In one example embodiment, the input digitizer 220 translates the physical points on the screen that the input mechanism 120 made contact with into a set of instructions for updating what is provided for display on the screen. For example, if the input detector module 210 detects an intentional gesture that swipes from a first page to a second page, the input digitizer 220 receives the analog signal generated by the input mechanism 120 as it performs the swiping gesture. The input digitizer 220 generates a digital signal for the swiping gesture that provides instructions for the display system 230 of the e-paper tablet device 110 to update the user interface of the screen to transition from, for example, a current (or first page) to a next (or second page, which may be before or after the first page).

In one example embodiment, the graphics generator 240 receives the digital instructional signal (e.g., swipe gesture indicating page transition (e.g., flipping or turning)) generated by the input digitizer 220. The graphics generator 240 generates graphics or an update to the previously displayed user interface graphics based on the received signal. The generated or updated graphics of the user interface are provided for display on the screen of the e-paper tablet device 110 by the display system 230, e.g., displaying a transition from a current page to a next page to a user. In the displayed embodiment of the FIG. 2, the graphics generator 240 comprises a rasterizer module 250 and a depixelator module 260. Input gestures drawn by a user on a contact-sensitive surface are received as vector graphics and are input to the rasterizer module 250. The rasterizer module 250 converts the input vector graphics to raster graphics, which can be displayed (or provided for display) on the contact-sensitive surface. The depixelator module 260 may apply image processing techniques to convert the displayed raster graphics back into vector graphics, for example to improve processing power of the e-paper tablet device 110 and to conserve memory of the e-paper tablet device 110. In at least one implementation, the depixelator module 260 may convert a displayed raster graphic back to a vector graphic when exporting content displayed on the screen into a different format or to a different system.

Further details about structures and functions of e-paper tablets and their graphical displays can be found in U.S. Pat. No. 11,158,097 to Martin Sandsmark and Gunnar Sletta entitled "Generating vector graphics by processing raster graphics" and in U.S. Pat. No. 10,824,274 to Sondre Hoff Dyvik, Martin Sandsmark, and Magnus Haug Wanberg, entitled "Interactive displays," both of which are incorporated by reference herein.

Figure 3:
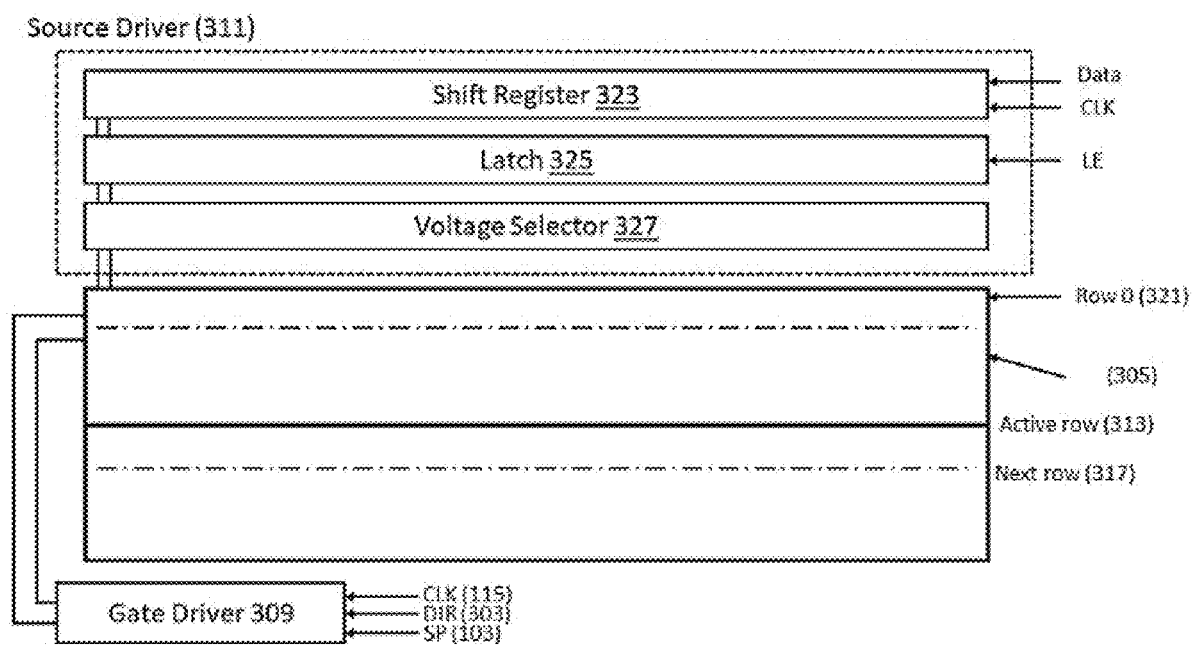
FIG. 3 illustrates hardware components of an example Electrophoretic Display (EPD) in accordance with a disclosed embodiment.

FIG. 3 illustrates hardware components of an example Electrophoretic Display (EPD) in accordance with a disclosed embodiment. The EPD may be part of the display system 230 of the e-paper tablet device 110, as shown in FIG. 2. The EPD includes a gate driver 309, a source driver 311, a shift register 323 with data and clock signal line, a latch 325, a voltage selector 327, and rows making up a display 305. The EPD industry borrowed certain components and concepts from the LCD industry; however, these two devices have some fundamental differences as well. Of particular relevance here is the persistence of pixels in EPD displays. Unlike LCD displays, EPD displays do not require the frequent refreshing required in an LCD display. In an EPD display, once a neutral voltage is set for a pixel, the pixel will not change, for example, and will persist for a long period of time, especially relative to an LCD display.

As mentioned, Electrophoretic displays (EPDs) 305 have utilized many aspects of LCD production infrastructure and driving mechanisms. The driving electronics typically consist of a gate driver (GD) 309 and a source driver (SD) 311. The display 305 has multiple rows of pixels. Pixel values within a row may be changed, e.g., logic high voltage may be a "black" pixel and a logic low voltage or "ground" may be a no color pixel. The pixels in the EPD 305 function similarly to small capacitors that persist over long time intervals. An EPD pixel contains a large number of charged particles that are suspended in a liquid. If a charge is applied, the particles will move to a surface where they become visible. White and black particles have opposite charges such that a pixel's display may change from white to black by applying an opposite charge to the pixel. Thus, the waveforms applied to an EPD comprise long trains of voltages to change from black to white or vice versa. The EPD arts are also known to have the ability to apply variable voltage levels that mix the white and black particles to produce various shades of gray. Voltage levels in a pixel also may be tiered between to provide shades between no color and black (e.g., levels of grey). Groups of pixels around each other may form a region that provides some visible characteristic to a user, e.g., an image on a screen, e.g., of the display system 230 of the e-paper tablet device 110.

To change pixel values in a region, a scan of a display 305 will conventionally start at a top row, e.g., row 0 321, and apply voltages to update pixels within a particular row where pixels need to be changed to correspond with the image that is displayed. In this example, a start pulse (GDSP) 103 can be used to reset the driver 311 to row 0 321. A row-by-row selection is made by driving the driver gate 309 to select a row, e.g., active row 313. All pixels in one row are addressed concurrently using data transferred to the display. Latch 325 receives from the shift register 323 the next set of voltages to be applied to a row of pixels. When the scan of the active row is completed and, if necessary, pixels changed or updated, a clock pulse (GDCLK) 115 is issued to the driver gate 309 to change to the next row 317 for a scan.

The source driver 311 is used to set the target voltage for each of the pixels/columns for the selected row. It consists of a shift register 323 for holding the voltage data, a latch circuit 325 for enabling pixel data transfer while the previous row is being exposed, and a voltage selector (multiplexer) 327 for converting the latched voltage selection into an actual voltage. For all rows to be updated all the voltage values have to be shifted into the register 323 and latched for the voltages to be available.

Example Active Pen Operation

An active pen-stylus (or more commonly "active pen") is a pen-stylus input device that allows users to e.g., write, sketch or draw onto the display of the computing device, e.g., the e-paper tablet 110. As discussed below, these pen-styluses can be equipped with a tail eraser allowing the user to erase content from the display of the computing device, e.g., the e-paper tablet 110. An active pen includes electronics components which enables the active pen to send and receive signals from the computing device.

Figure 4:
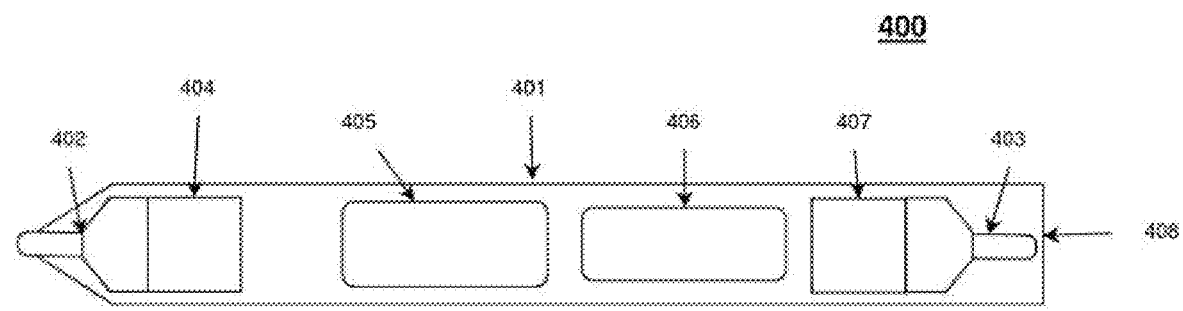
FIG. 4 illustrates a pen-stylus 400 suited for application in at least one embodiment of the invention.

FIG. 4 illustrates an active pen-stylus 400 that comprises a core member 402 that itself comprises one or multiple antennas. The active pen-stylus 400 may include various conventional pressure sensing systems. For example, the antenna system in the core member 402 is connected to another core member 404, the pressure sensing system for the active pen-stylus 400. In embodiments where the active pen 400 enables tail eraser functionality through a secondary antenna system (such embodiments discussed in FIG. 6 and FIGS. 6A-6D), the active pen 400 further comprises a second antenna system 403, which enables the active pen 400 to transmit and receive signals to the computing device (e.g., the e-paper tablet 110) through the tail eraser portion of the active pen 400 near the cap 408. In this embodiment, the active pen 400 could also comprise a second pressure sensing system 407 that controls the pressure imparted to the display of the computing device from the erasure activity. As disclosed in the embodiments herein, the active pen 400 includes an active pen-stylus system that receives user input data regarding drawing on a screen of the associated computing device and as disclosed in embodiments herein, the active pen 400 also includes an erasure system that receives user input data related to erasing portions of a display on the screen of the associated computing device. In a sense, the erasure system operates as an almost inverse active pen-stylus system, e.g., where one draws, the other erases.

An active pen 400 conventionally comprises a PCB 405 which includes electronic components needed for driving the signal lines in 402 and 403. (For example, the elements 601 and 625 shown in FIG. 6 could be a part of the PCB 405.) The PCB 405 may also process data received from the core member 404 and the core member 407 for both simple or advanced pressure sensing with high resolution sensing of the pressure level during the interaction between the active pen 400 and the surface of the computing device (e.g., the e-paper tablet 110). The active pen 400 typically includes an external casing 401 as a pen-stylus holder, formed in a cylindrical shape typically made of non-metal material such as a plastic that contains the internal electronics within the casing 401. The top end of the casing 401 may be provided with a cap 408.

Example Precision Eraser Operation

Active pen-styluses, such as the stylus 400 shown in FIG. 4, may be equipped with an eraser (or "electronic eraser" or "precise eraser" or "pseudo eraser"), often located on the tail end of the pen-stylus, which allows users to erase content from the display of the computing device, e.g., the e-paper tablet 110 shown in FIG. 1. Unlike a conventional eraser, a tail eraser may be configured to provide erasure information even when the tail erasing part of the active pen-stylus is not touching or otherwise in physical contact with the display.

A conventional rubber eraser may be used in a number of different ways and orientations with different results. For example, when using a conventional rubber eraser, one can control the area of erasure by adjusting the angle of incidence of the rubber eraser to allow a larger or smaller area to be actively erased. Among other things, the active pen-stylus erasure function may be designed to replicate this feature found in rubber erasers and to perform such functions without the active pen-stylus eraser necessarily touching the display. Accordingly, the stylus 400 includes additional structures and functional configurations to provide this advanced erasure capability. This same structure may also be used for other functions, such as controlling the opacity with the additional tilt information; however, the examples provided below will focus on the erasure function—although the only actual difference is what the display is instructed to do with the information that it receives from the pen-stylus.

Figure 5A:
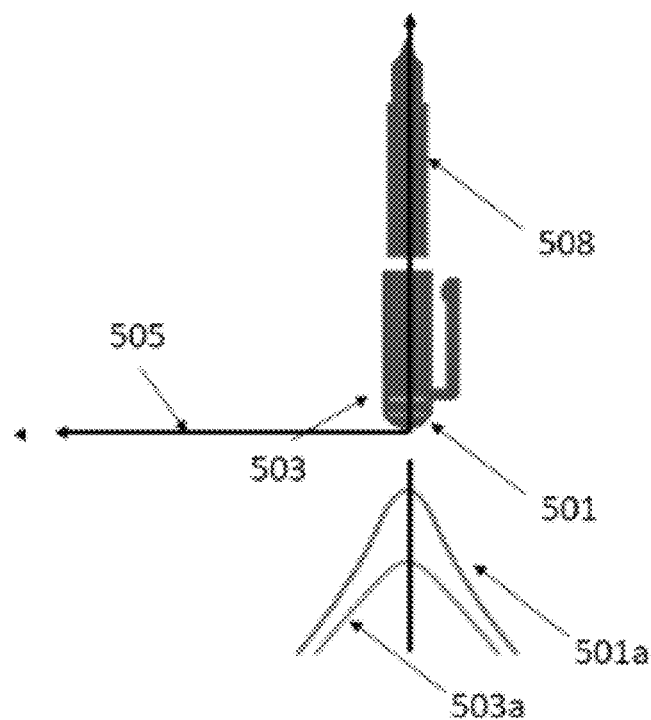
FIGS. 5A-5B illustrate an active pen-stylus 508 that employs two separate transmitters 501, 503 to assist in the measurement of the pen-stylus' tilt angle relative to the surface of a display of the e-paper tablet device, according to at least one embodiment of the invention.
Figure 5B:
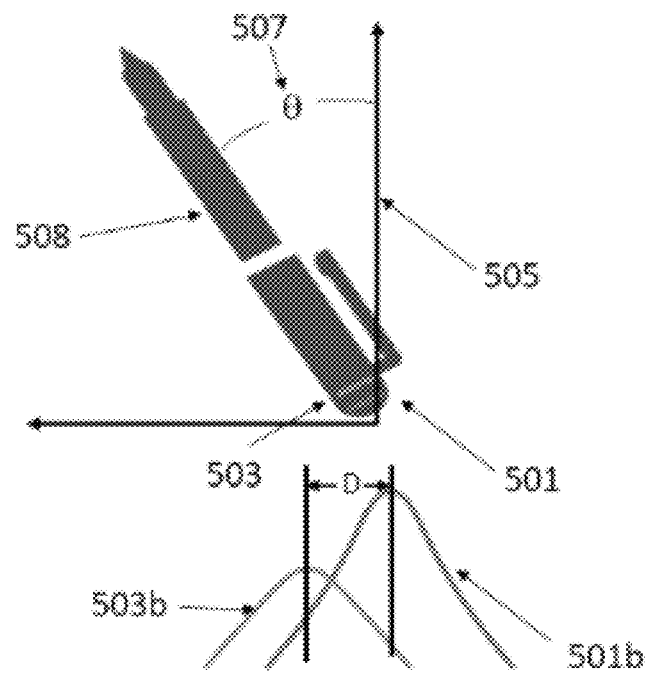

As shown in FIGS. 5A-5B, employing two separate transmitters 501, 503 in the tail eraser part (e.g., the core 403 shown in FIG. 4) of the active pen-stylus 508 gives the computing device (e.g., the e-paper tablet 110) the ability to measure two distinct signals (illustrated in FIG. 5A as 501a, 503a and illustrated in FIG. 5B as 501b, 503b). By knowing the antenna separation in the input device (e.g., the active pen-stylus 508), the input digitizer 220 in a larger computing device, such as but not limited to the e-paper tablet 110, can derive the active pen-stylus tilt angle $\theta$ 507 relative to the computing device (e.g., the e-paper tablet 110). The input digitizer 220 is conventionally able to process active pen-stylus tilt information related to the drawing portion of the active-pen stylus. As such only a slight change needs to be made to the input digitizer 220 for it to process eraser tilt angle data to cause a change to the display on the e-paper tablet 110. As seen in FIG. 5A, the signals 501a, 503a from the two antennas 501, 503 coincide when the active pen-stylus 508 is perpendicular to the graphics display of the computing device (as shown by the grid 505 and the line passing through the centers of both signals 501a, 503a). In contrast, FIG. 5B illustrates the active pen-stylus 508 tilted by an angle $\theta$ 507 relative to the display of the computing device (e.g., the e-paper tablet 110) as shown by the grid 505 and the distance D marking the distance between the two centers of signals 501b, 503b. With such a tilt, the signals 501b, 503b from the two antennas 501, 503 are not aligned and are separated by the distance D. This distance D may be used to determine the amount of erasure performed by the e-paper tablet device on the display.

The method for deriving the tilt angle $\theta$ 507 of the active pen-stylus 508 is known when using two antennas (e.g., two separate antennas in the antenna system 403 shown in FIG. 4, presented in FIGS. 5A and 5B as antennas 501, 503). The distance between antenna 501 and the antenna 503 is fixed and known. This known separation, combined with basic trigonometry, can be employed in active pen tip antenna systems to derive the tilt angle for the active pen-stylus tip (e.g., the angle of the tip of the core member 403 shown in FIG. 4 relative to the display 230 shown in FIG. 2 on the e-paper tablet 110). Thus, in one embodiment of the invention, as the tilt angle $\theta$ increases, the area of erasure proportionately increases. One could similarly imagine a slightly different arrangement of the components such that as the tilt angle $\theta$ decreased, the area of erasure proportionately increased, e.g., in inverse proportion. In both embodiments, the area of erasure still has a direct correlation to the tilt angle θ, e.g., as the tilt angle changes, the area of erasure changes.

Embodiments of the invention allow for the derivation of the tilt angle of the tail eraser by employing an electronically calculated method in the input digitizer 220 similar to that employed conventionally by the input digitizer 220 for determining the tilt of the marker tip. Such a calculation requires that the pen-stylus provide additional data/information to the input digitizer 220. However, conventional pen-stylus integrated circuits do not have a sufficient number of antenna signal lines for driving two transmitters in both the active pen tip and tail eraser antenna system. Conventional active pens have two antenna signal lines for the active pen-stylus tip and one antenna signal line for a tail eraser. Thus, no more than three antenna signal lines. With this conventional configuration, the input digitizer 220 (or comparable hardware) cannot derive the tilt information for the tail eraser. The inventors have solved this problem in a manner that allows a conventional active pen configuration to drive four antennas rather than the conventional three antennas, thus enabling enhanced erasure capabilities.

Figure 6:
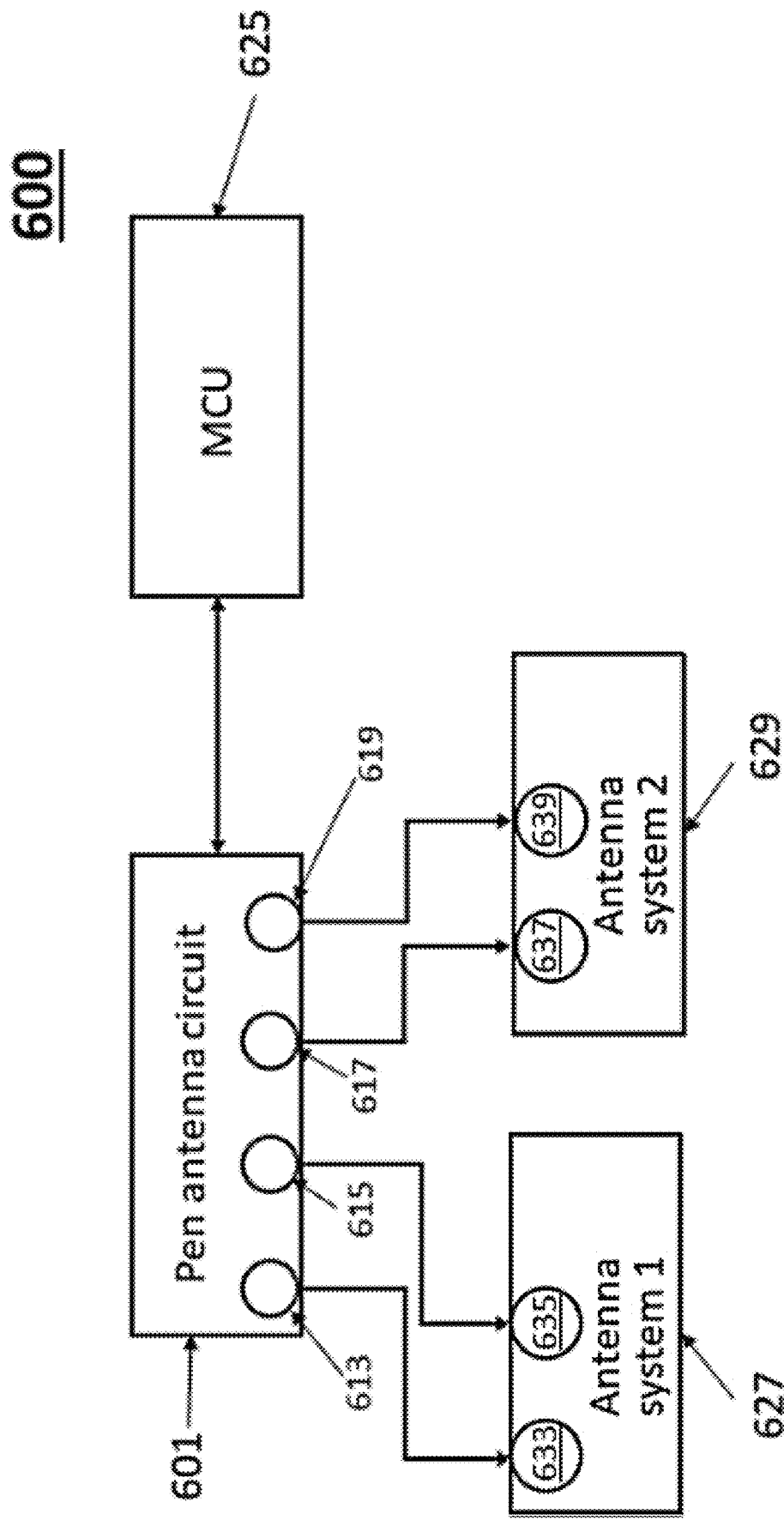
FIG. 6 illustrates a hardware structure 600 that provides the appropriate data transmission to a computing device, such as an e-paper tablet device, for computing the tilt of the pen-stylus tip and/or tilt of the tail eraser on the pen-stylus.

FIG. 6 illustrates a hardware structure 600 that provides the appropriate data transmission to a computing device, such as an e-paper tablet device, for computing the tilt of the pen-stylus tip and/or tilt of the tail eraser on the pen-stylus. In short, the pen antenna circuit 601 shown in FIG. 6 comprises four antenna signal lines rather than the three antenna signal lines conventional employed. As discussed below, some embodiments of the invention employ conventional pen integrated circuits that have been specially adapted to handle the extra fourth antenna signal line.

The hardware structure 600 for implementation into the pen-stylus 400 shown in FIG. 04 comprises a pen antenna circuit 601, a micro-control unit 625, and a first antenna system 1 627, and a second antenna system 2 629. Antenna system 1 627 comprises two antennas 633, 635 that respectively connect to antenna signal lines 613, 615 in the pen antenna circuit 601, and antenna system 2 629 comprises two antennas 637, 639 that respectively connect to antenna signal lines 617, 619 in the pen antenna circuit 601.

As mentioned, the pen antenna circuit 601 has an added fourth antenna signal line 619, which provides one more antenna signal line than conventionally employed (e.g., signal lines 613-617). Thus, adding a fourth signal line (through the various hardware modifications discussed below), enables operation of two separate but similar antenna systems (Antenna System 1 627 and Antenna System 2 629) that are capable of transmitting sufficient information for derivation of the tilt angle (e.g., the tilt angle θ 507 shown in FIGS. 5A and 5B), as well as conventional pen-stylus functionality. Accordingly, FIG. 6 illustrates a hardware structure 600 that can provide the appropriate data transmission to a computing device (e.g., the e-paper tablet device) for computing the tilt angle (e.g., the tilt angle θ 507 shown in FIGS. 5A and 5B) of the tail eraser as well as the tilt angle of the pen-stylus tip. As such, the Antenna System 2 629 comprises an eraser antenna system.

The pen antenna circuit 601 is connected to the antenna systems 627, 629 that each consists of two transmitters (transmitters 633, 635 for antenna system 627 and transmitters 637, 639 for antenna system 629. Thus, the two antenna systems 627, 629 together have a total of four transmitters. This combination allows one pair of antennas to transmit data related to the front core member 402 shown in FIG. 4, thus forming an active pen-stylus antenna system, while another pair of antennas transmits data from the tail core member 403 shown in FIG. 4, thus forming an eraser antenna system.

As mentioned above, a conventional pen antenna circuit 601 supports no more than three antenna signal lines. Thus, the inventors have also created a way for enabling a conventional pen antenna circuit 601 to support four antenna signal lines rather than just three. A conventional pen antenna circuit 601 is typically implemented with a single pen integrated circuit, and such conventional hardware may be employed in embodiments of the present invention. As noted, the two antenna systems 627 and 629 correspond to the antenna systems 402 and 403 shown in FIG. 4.

As is known in the art, it is possible in a conventional hardware installation to use the third antenna signal line for a tail eraser embodiment having only one transmitter—but such a configuration cannot provide the tilt information needed for the embodiments of the invention described herein. To overcome this limitation, the inventors have created a way to employ a fourth antenna signal line in a conventional pen integrated circuit to communicate through a fourth antenna.

Figure 6A:
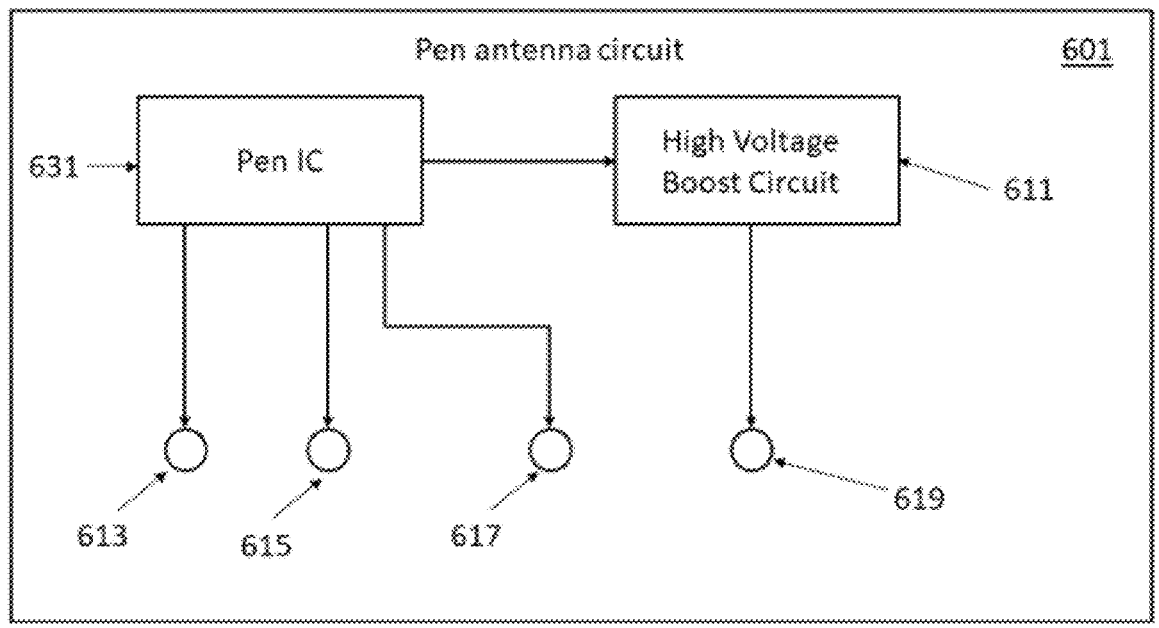
FIG. 6A illustrates an embodiment of the invention in which the pen antenna circuit 601 employs a conventional Pen IC 631 having a general purpose input/output port (GPIO) of the Pen IC 621 and a high voltage boost circuit 611 in order to enable a fourth antenna signal line.
Figure 6B:
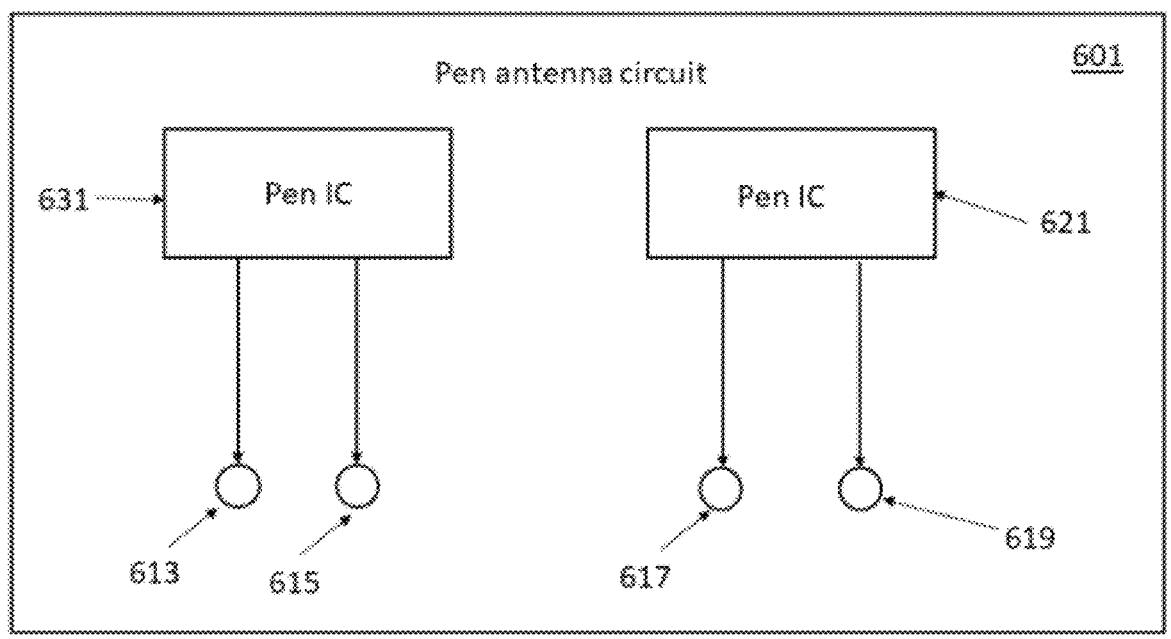
FIG. 6B illustrates an embodiment of the invention in which the pen antenna circuit 601 employs two pen ICs 631, 621 that are controlled by the MCU 625 shown in FIG. 6 in order to enable a fourth antenna signal line.
Figure 6C:
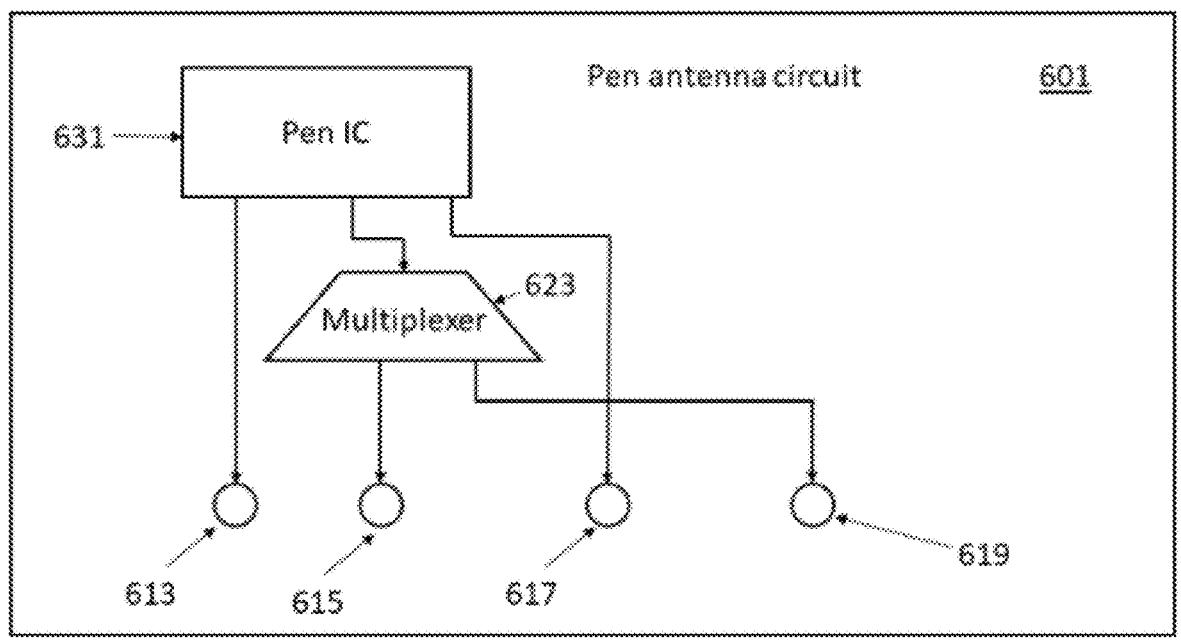
FIG. 6C illustrates an embodiment of the invention in which the pen antenna circuit 601 employs a conventional Pen IC 631 where the signals (e.g., 501a, 503a and/or 501b, 503b shown in FIGS. 5A and 5B) are multiplexed in a signal multiplexer 623 and controlled by a micro-control unit 625 (shown in FIG. 6) in order to enable a fourth antenna signal line.
Figure 6D:
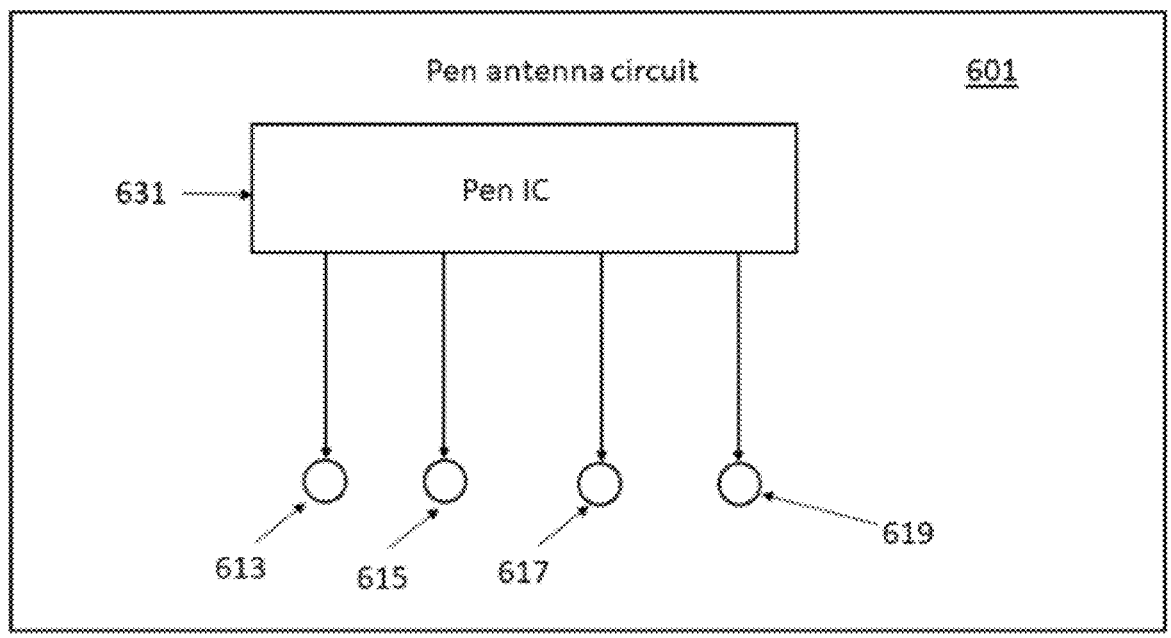
FIG. 6D illustrates an embodiment of the invention in which the pen antenna circuit 601 employs a Pen IC 631 that supports the four antenna outputs 613, 615, 617, and 619 natively.

The inventors have created several embodiments of the invention that overcome the limitations of conventional hardware, as shown in FIGS. 6A-6C. In addition, the inventors have also created an embodiment of the invention, as shown in FIG. 6D, in which the pen antenna circuit has four antenna signal lines natively, which represents a type of hardware not conventionally employed in pen-styluses.

FIG. 6A illustrates an embodiment of the invention in which the pen antenna circuit 601 employs a conventional Pen IC 631 having three antenna signal lines and having at least one general purpose input/output port (GPIO) in the Pen IC 631 and a high voltage boost circuit 611 in order to enable a synthetic fourth antenna signal line. Thus, the fourth antenna signal 619 is essentially created from a weak signal transmitted out of a conventional GPIO and then boosted appropriately by the high voltage boost circuit 611 to achieve an appropriate antenna signal strength. In this particular embodiment, Antenna system 1 627 that receives signals from the signal lines 613, 615 would be the active pen-stylus tip and Antenna system 2 629 receives signals from the signal lines 617, 619 correspond to the tilt eraser (e.g., the signals 501a, 503a and/or 501b, 503b shown in FIGS. 5A and 5B). Thus, in this embodiment, Antenna system 1 627 corresponds to antenna 402 shown in FIG. 4 (e.g., an active pen-stylus antenna system) while antenna system 2 629 corresponds to antenna system 403 shown in FIG. 4, thus comprising an eraser antenna system.

FIG. 6B illustrates an embodiment of the invention in which the pen antenna circuit 601 employs two pen ICs 631, 621 that are controlled by the MCU 625. In this particular embodiment, the Antenna system 1 627 that receives signals from the signal lines 613, 615 would be the active pen-stylus tip and Antenna system 2 629 that receives signals from the signal lines 617, 619 would be the tilt eraser (e.g., the signals 501a, 503a and/or 501b, 503b shown in FIGS. 5A and 5B). Thus, in this embodiment, Antenna system 1 627 corresponds to antenna 402 shown in FIG. 4 (e.g., an active pen-stylus antenna system) and antenna system 2 629 corresponds to antenna system 403 shown in FIG. 4, thus comprising an eraser antenna system.

FIG. 6C illustrates an embodiment of the invention in which the pen antenna circuit 601 employs a conventional Pen IC 631 where the signals (e.g., 501a, 503a and/or 501b, 503b shown in FIGS. 5A and 5B) are multiplexed in a signal multiplexer 623 and controlled by a micro-control unit 625

(shown in FIG. 6). The micro-control unit 625 and the Pen IC 631 communicate in order to set the multiplexing of one antenna signal. In this particular embodiment, Antenna system 1 627 would be the active pen-stylus tip and Antenna system 2 629 would be the tilt eraser. Thus, in this embodiment, Antenna system 1 627 corresponds to antenna 402 shown in FIG. 4 (e.g., an active pen-stylus antenna system) and antenna system 2 629 corresponds to antenna system 403 shown in FIG. 4, thus comprising an eraser antenna system.

FIG. 6D illustrates an embodiment of the invention in which the pen antenna circuit 601 employs a Pen IC 631 that supports the four antenna outputs 613, 615, 617, and 619 natively. As mentioned, a pen integrated circuit that supports four antenna outputs is not conventionally employed in pen-styluses. In this particular embodiment, Antenna system 1 627 would be the active pen-stylus tip and Antenna system 2 629 would be the tilt eraser (e.g., the signals 501a, 503a and/or 501b, 503b shown in FIGS. 5A and 5B). Thus, in this embodiment, Antenna system 1 627 corresponds to antenna 402 shown in FIG. 4 (e.g., an active pen-stylus antenna system) and antenna system 2 629 corresponds to antenna system 403 shown in FIG. 4, thus comprising an eraser antenna system.

Figure 7:
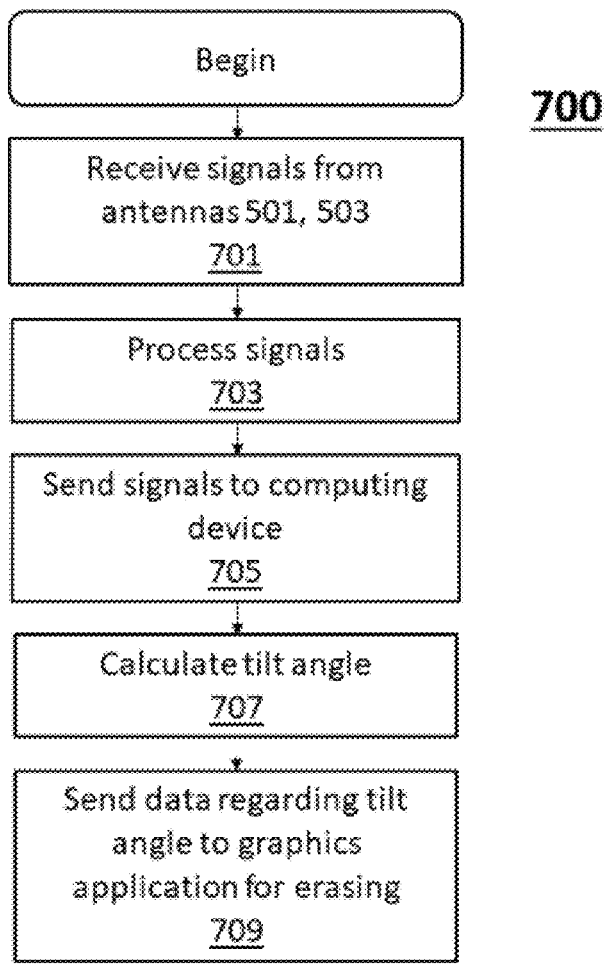
FIG. 7 illustrates a flowchart 700 showing the steps performed in determining the tilt angle of the pen-stylus and how the calculated tilt angle may be used to determine an amount of erasure on the display of the e-paper tablet device, according to one embodiment.

FIG. 7 illustrates a flowchart 700 that shows the steps performed in determining the tilt angle θ 507 of the pen-stylus relative to the graphics display and how this tilt angle may be used to determine an amount of erasure on the display 230. The signals from the antenna 501, 503 are received (step 701) in a circuit (e.g., the hardware structure 600 shown in FIG. 6) in the pen-stylus 508. The received signals are processed (step 703) by the Pen antenna circuit 601 shown in FIG. 6. The antenna system (e.g., the antenna system 2 629 shown in FIG. 6, which may also be the antenna system 403 shown in FIG. 4), sends (step 705) the processed signals to the computing device (e.g., the e-paper tablet 110). The input digitizer 220 in the computing device calculates (step 707) the tilt angle of the pen-stylus 508 in the manner described previously and sends (step 709) to the display system 230 in the computing device 110 to perform the erasing (step 711). Some steps shown in the flowchart 700 could be performed in another order. For example, step 707 could be performed either before or after step 705.

Figure 8A:
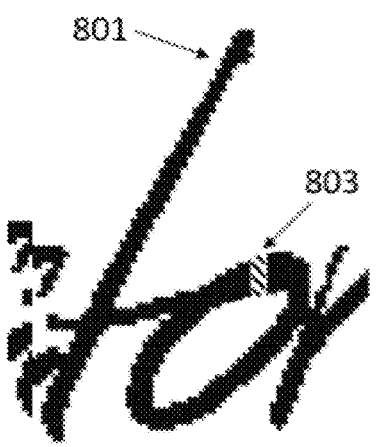
FIGS. 8A-8B illustrate the results of the different types of erasures made on a graphics display depending on the calculated tilt angle, according to one embodiment.
Figure 8B:
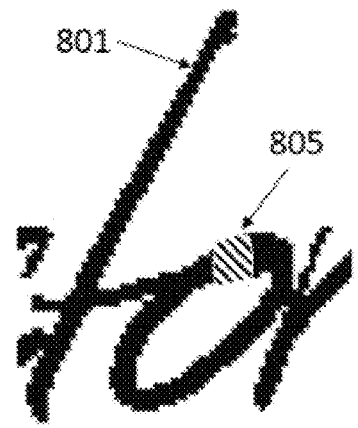

FIG. 8A and FIG. 8B illustrate the results of the different types of erasures made to a graphics display depending on the calculated tilt angle, according to an embodiment of the invention. FIG. 8A shows a drawing 801 in the case where the tilt angle between the two antennas on the pen-stylus is identical, meaning that the pen-stylus is perpendicular (or 90°) to the graphics display of the e-paper tablet device. At a perpendicular (90°) tilt angle, the area of erasure is rather slender as shown by erasure zone 803. FIG. 8B illustrates the case in which the tilt angle between the two antennas on the pen-stylus is not aligned, and the pen-stylus is not perpendicular to the graphic display but is tilted at an angle. In such embodiments of the invention, a larger area of erasure 805 will occur on the drawing 801. The process of updating an EPD display has been previously shown in FIG. 3. The amount of erasure 805 would increase or decrease depending on the actual tilt angle. In essence a larger tilt angle approach 0° or 180° will produce a greater area of erasure, and the size of the area of erasure increases as the tilt angle approaches 0° or 180°, according to an embodiment of the invention.

Example Computing Machine Architecture

Figure 9:
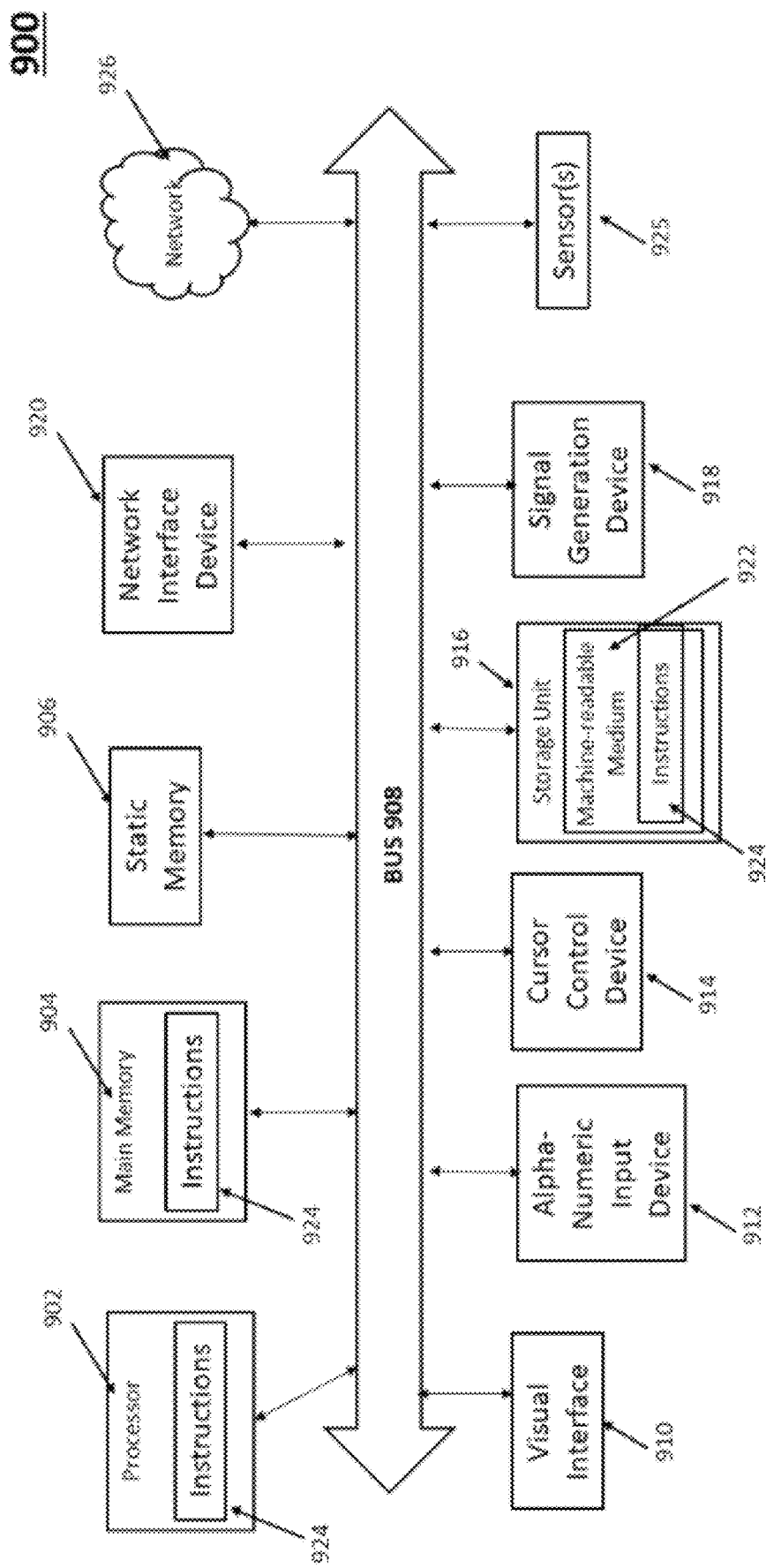
FIG. 9 is a block diagram illustrating components of an example machine able to read instructions from a machine-readable medium and execute them in a processor (or controller), according to one embodiment.

FIG. 9 is a block diagram illustrating components of an example machine able to read instructions from a machine-readable medium and execute them in a processor (or controller), according to one embodiment. FIG. 9 is an example of a processing system, of which a some of the described components or all of the described components may be leveraged by the modules described herein for execution.

In this example, FIG. 9 shows a diagrammatic representation of a machine in the example form of a computer system 900 (e.g., the computing portions of the e-paper tablet 111 shown in FIG. 1) within which program code (e.g., software) for causing the machine to perform any one or more of the methodologies discussed herein may be executed. The e-paper tablet device 110 may include some or all of the components of the computer system 900. The program code may be comprised of instructions 924 executable by one or more processors 902. In the e-paper tablet system 110, the instructions may correspond to the functional components described in FIGS. 1-3.

While the embodiments described herein are in the context of the e-paper tablet system 110, it is noted that the principles may apply to other touch sensitive devices. In those contexts, the machine of FIG. 9 may be a server computer, a client computer, a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processors 902 (e.g., a central processing unit (CPU), one or more graphics processing units (GPU), one or more digital signal processors (DSP), one or more application specific integrated circuits (ASICs), one or more radio-frequency integrated circuits (RFICs), or any combination of these), a main memory 904, and a static memory 906, which are configured to communicate with each other via a bus 608. The computer system 900 may further include visual display interface 910. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 910 may include or may interface with a touch enabled screen, e.g., of the e-paper tablet system 110 and may be associated with the display system 230. The computer system 900 may also include an input device 912 (e.g., a pen-stylus, a keyboard or touch screen keyboard), a cursor control device 914 (e.g., a mouse, a trackball, a joystick, a motion sensor, or other pointing instrument), a storage unit 916, a signal generation device 918 (e.g., a speaker), and a network interface device 920, which also are configured to communicate via the bus 608.

The storage unit 916 includes a machine-readable medium 922 on which is stored (or encoded) instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 (e.g., software) may be transmitted or received over a network 626 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium that is capable of storing instructions (e.g., instructions 924) for execution by the machine and that cause the machine to perform any one or more of the methodologies disclosed herein. The term "machine-readable medium" includes, but not be limited to, data repositories in the form of solid-state memories, optical media, and magnetic media.

The computer system 900 also may include the one or more sensors 925. Also note that a computing device may include only a subset of the components illustrated and described with FIG. 9. For example, an IoT device may only include a processor 902, a small storage unit 916, a main memory 904, a visual interface 910, a network interface device 920, and a sensor 925.

Additional Considerations

This disclosed configuration provides additional precision and options for users as they go about erasing portions of drawings on an e-paper tablet. This should improve the efficiency of users interacting with e-paper tablets while also enabling them with more precise functional capabilities.

It is to be understood that the figures and descriptions of the present disclosure have been simplified to illustrate elements that are relevant for a clear understanding of the present disclosure, while eliminating, for the purpose of clarity, many other elements found in a typical system. Those of ordinary skill in the art may recognize that other elements and/or steps are desirable and/or required in implementing the present disclosure. However, because such elements and steps are well known in the art, and because they do not facilitate a better understanding of the present disclosure, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A system for determining an area of erasure in an active pen-stylus, comprising:

an active pen-stylus system in the active pen-stylus that receives user drawing data input related to drawing on a screen of a display device;

an erasure system in the active pen-stylus, that receives user erasure data input related to erasing portions of a display on the screen of the display device;

a pen antenna circuit in the active pen-stylus that receives the user drawing data from the active pen-stylus system and receives the user erasure data from the erasure system;

an active pen-stylus antenna system comprising at least two antennas, the active pen-stylus antenna system proximally located in a front portion of the active pen-stylus that receives user drawing data from the pen antenna circuit and uses the at least two antennas to transmit the drawing data to the display device for display on the screen;

an eraser antenna system comprising at least two antennas, the eraser antenna system proximally located in a rear portion of the active pen-stylus that receives user erasure data from the pen antenna circuit and uses the at least two antennas to transmit the user erasure data to the display device, wherein a first antenna of the at least two antennas in the eraser antenna system has a different location in the rear of the active pen-stylus than a second of the at least two antennas in the eraser antenna system, wherein the user erasure data includes orientation data related to the first antenna and the second antenna of the at least two antennas in the eraser antenna system, wherein a graphics display component in the display devices uses the received user erasure data to compute a tilt angle between the first of the at least two antennas in the eraser antenna system and the second of the at least two antennas in the eraser antenna system to determine the area of erasure associated with the display on the screen of the computing device.

2. The system for determining an area of erasure in an active pen-stylus of claim 1, the eraser antenna system further comprising:
   a pen integrated circuit in the pen antenna circuit having no more than three antenna output signal lines and at least one a general purpose input/output port (GPIO), wherein the GPIO transmits a fourth antenna output signal; and
   a high voltage boost circuit in the pen antenna circuit that receives the fourth antenna output signal and boosts the fourth antenna output signal to antenna signal strength, wherein the first antenna of the at least two antennas in the eraser antenna system receives the boosted fourth antenna output signal from the high voltage boost circuit and transmits the boosted fourth antenna output signal to the computing device.

3. The system for determining an area of erasure in an active pen-stylus of claim 1, further comprising:
   a first pen integrated circuit in the pen antenna circuit having no more than three antenna output signal lines; and
   a second pen integrated circuit in the pen antenna having no more than three antenna output signal lines;
   a micro-control unit that controls operations of the first pen integrated circuit and the second pen integrated circuit;
   wherein the first pen integrated circuit transmits signals associated with the active pen-stylus system to the active pen-stylus antenna system; and
   wherein the second pen integrated circuit transmits signals associated with the erasure system to the eraser antenna system.

4. The system for determining an area of erasure in an active pen-stylus of claim 1,
   a pen integrated circuit in the pen antenna circuit having no more than three antenna output signal lines, wherein a first antenna output signal line of the no more than three antenna output signal lines transmits signals to a first antenna of the active pen-stylus antenna system and a second antenna output signal line of the no more than three antenna output signal lines transmits signals to a first antenna of the eraser antenna system;
   a micro-control unit that controls operations of the pen integrated circuit and a multiplexer;
   a multiplexer that receives a third output signal line of the no more than three antenna output signal lines from the pen integrated circuit, wherein the micro-control unit directs the multiplexer to send the multiplexer the third output signal line to one of a first antenna of the active pen-stylus antenna system or a first antenna of the eraser antenna system, wherein the micro-control unit alternates between the first antenna of the active pen-stylus antenna system and the first antenna of the eraser antenna system.

5. The system for determining an area of erasure in an active pen-stylus of claim 1, further comprising
   a pen integrated circuit in the pen antenna circuit having at least four antenna output signal lines, wherein a first antenna output signal line of the at least four antenna output signal lines and a second antenna output signal line of the at least four antenna output signal lines send signals to the active pen-stylus antenna system, wherein a third antenna output signal line of the at least four antenna output signal lines and a fourth antenna output signal line of the at least four antenna output signal lines send signals to the eraser antenna system.

6. The system for determining an area of erasure in an active pen-stylus of claim 1, wherein the active pen-stylus receives the user erasure data without the active pen-stylus being in physical contact with the screen.

7. The system for determining an area of erasure in an active pen-stylus of claim 1, wherein the graphics display component increases the area of erasure in direct correlation to a degree of the computed tilt angle.

8. The system for determining an area of erasure in an active pen-stylus of claim 7, wherein the graphics display component increases the area of erasure in direct proportion to the degree of the computed tilt angle.

9. The system for determining an area of erasure in an active pen-stylus of claim 7, wherein the graphics display component increases the area of erasure in inverse proportion to the degree of the computed tilt angle.

10. The system for determining an area of erasure in an active pen-stylus of claim 1, wherein the received user drawing data includes pressure sensing data.

11. The system for determining an area of erasure in an active pen-stylus of claim 1, wherein a first antenna in the active pen-stylus antenna system has a different location in the front of the active pen-stylus than a second of the at least two antennas in the active pen-style antenna system, wherein the user drawing data includes orientation data related to the first antenna and the second antenna of the at least two antennas in the active-pen stylus antenna system,
   wherein the graphics display component computes a tilt angle between the first of the at least two antennas in the drawing antenna system and the second of the at least two antennas in the drawing antenna system to determine an area of marking associated with the display on the computing device controlled by the graphics display.

* * * * *